(12) United States Patent
Greene et al.

(10) Patent No.: US 6,854,183 B2
(45) Date of Patent: Feb. 15, 2005

(54) LEAD-FREE BEARING

(75) Inventors: Robert L. Greene, Ann Arbor, MI (US); Warren J. Whitney, Ypsilanti, MI (US); James M. Carpenter, Willis, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 10/730,308

(22) Filed: Dec. 8, 2003

(65) Prior Publication Data

US 2004/0111892 A1 Jun. 17, 2004

Related U.S. Application Data

(62) Division of application No. 10/265,953, filed on Oct. 7, 2002, now Pat. No. 6,746,154.
(60) Provisional application No. 60/327,886, filed on Oct. 8, 2001.

(51) Int. Cl.[7] ............................................. B21D 53/10
(52) U.S. Cl. ............................. 29/898.058; 29/898.056; 29/898.057; 29/898.13; 29/898.14; 428/674
(58) Field of Search ...................... 29/898.058, 898.13, 29/898.14, 898.056, 898.057; 428/674; 384/276, 280, 294, 912

(56) References Cited

U.S. PATENT DOCUMENTS

| | | | | |
|---|---|---|---|---|
| 2,198,253 A | * | 4/1940 | Koehring | 419/9 |
| 2,290,338 A | * | 7/1942 | Koehring | 219/603 |
| 2,902,748 A | * | 9/1959 | Schaefer | 29/898.058 |
| 3,753,695 A | | 8/1973 | Lloyd | |
| 4,121,928 A | * | 10/1978 | Mori | 419/3 |
| 4,170,469 A | | 10/1979 | Mori | |
| 4,309,064 A | | 1/1982 | Fukuoka et al. | |
| 4,412,972 A | | 11/1983 | Mori | |
| 4,540,437 A | | 9/1985 | Patel | |
| 4,551,395 A | | 11/1985 | Lloyd | |
| 4,579,712 A | * | 4/1986 | Mori | 419/9 |
| 4,590,133 A | | 5/1986 | Lloyd | |
| 4,608,085 A | * | 8/1986 | Eudier et al. | 75/247 |
| 4,620,185 A | | 10/1986 | Plahmer | |
| 4,957,822 A | | 9/1990 | Steeg et al. | |
| 5,045,405 A | | 9/1991 | Koroschetz et al. | |
| 5,087,529 A | | 2/1992 | Engel et al. | |
| 5,093,207 A | | 3/1992 | Hodes et al. | |
| 5,122,208 A | | 6/1992 | Alabi | |
| 5,137,685 A | | 8/1992 | McDevitt et al. | |
| 5,137,792 A | | 8/1992 | Hodes et al. | |
| 5,167,726 A | | 12/1992 | LoIacono et al. | |
| 5,209,578 A | | 5/1993 | Eastham et al. | |
| 5,242,657 A | | 9/1993 | Sahu | |
| 5,286,445 A | | 2/1994 | Kamiya | |
| 5,288,458 A | | 2/1994 | McDevitt et al. | |
| 5,330,712 A | | 7/1994 | Singh | |
| 5,409,552 A | | 4/1995 | McDevitt et al. | |
| 5,413,756 A | | 5/1995 | Sahu | |
| 5,429,876 A | * | 7/1995 | Tanaka et al. | 428/553 |
| 5,441,555 A | | 8/1995 | Matthews et al. | |
| 5,487,867 A | | 1/1996 | Singh | |

(List continued on next page.)

FOREIGN PATENT DOCUMENTS

| | | | |
|---|---|---|---|
| GB | 2355016 | * | 4/2001 |
| JP | 57-070246 | * | 4/1982 |
| JP | 57-073147 | * | 5/1982 |
| JP | 2000-336442 | * | 12/2000 |

Primary Examiner—Eric Compton
(74) Attorney, Agent, or Firm—Howard & Howard

(57) ABSTRACT

A lead-free bearing includes a bronze matrix powder metal bearing layer bonded to a steel backing a fully densified. The bearing material has about 8 to 12% by weight tin, about 1 to less than 5% by weight bismuth, and about 0.03 to 0.08% by weight phosphorus, with the balance being copper. The tin is soluable in the copper to yield the bronze matrix, and the bismuth exists as finely dispersed, undissolved islands through the matrix. Such bearings exhibit physical properties comparable to or better than those of traditional bronze-lead bearings and improved wear in seizure properties.

2 Claims, 2 Drawing Sheets

U.S. PATENT DOCUMENTS

| | | |
|---|---|---|
| 5,614,038 A | 3/1997 | King et al. |
| 5,637,132 A | 6/1997 | Matthews et al. |
| 5,942,056 A | 8/1999 | Singh |
| 6,025,081 A | 2/2000 | Ohshiro et al. |
| 6,059,901 A | 5/2000 | Sahu |
| 6,149,739 A | 11/2000 | Smith |
| 6,254,701 B1 | 7/2001 | Oshiro et al. |
| 6,602,615 B2 | 8/2003 | Sakai et al. |
| 6,767,648 B2 * | 7/2004 | Saitou et al. ............... 428/548 |
| 2003/0049151 A1 * | 3/2003 | Wehler ........................ 419/28 |

* cited by examiner

LEAD-FREE BEARING

This application is a Division of Ser. No. 10/265,953 filed Oct. 7, 2002, now U.S. Pat. No. 6,746,154 claims the benefit of U.S. Provisional Application No. 60/327,886, filed Oct. 8, 2001 and U.S. application Ser. No. 10/265,953, filed Oct. 7, 2002.

BACKGROUND OF THE INVENTION

1. Technical Field

This invention relates generally to sliding-type bearings, and more particularly to those having a powder metal bronze bearing material applied to a steel backing, such as used in engine bearings.

2. Related Art

It is common in engine bearing applications to bond a powder metal bronze alloy to a steel backing to journal a crankshaft or the like. The copper tin matrix provides a strong bearing surface that can withstand the loads subjected on the bearing in use. Such bearings must also exhibit suitable wear and seizure resistance properties, and for this purpose it is common to add a certain amount of lead to the bronze matrix which serves as a lubricant to the bearing surface. It is also common to add a flash coating of tin to the running surface to further enhance the wear and seizure characteristics of the bearing.

Due to environmental considerations, various substitutes for lead have been explored, but to date none have demonstrated the ability to truly substitute for lead without unduly sacrificing the strength, wear and seizure properties of engine bearings. It is an object of the present invention to provide a suitable lead-free bronze engine bearing that exhibits comparable or better properties than those containing lead.

SUMMARY OF THE INVENTION AND ADVANTAGES

Applicants' have found that bismuth, when alloyed with powder metal bronze in a controlled amount along with a controlled amount of phosphorus provides a resultant steel-backed engine bearing whose physical properties are equal to or better than that of bronze lead bearings while also exhibiting wear and seizure resistant properties equal to or exceeding those of steel-backed powder metal bronze-lead engine bearings.

An engine bearing constructed according to the present invention comprises an essentially lead-free powder metal bearing material bonded to a steel backing. The bearing material consists essentially of 8 to 12% by weight of tin, 1 to less than 5% by weight of bismuth, and 0.03 to 0.8% by weight of phosphorus, with the balance being made up essentially of copper.

Engine bearings constructed according to the invention exhibit physical properties of tensile strength≧400 MPa, yield strength≧290 MPa, elongation≧10% and hardness≧130 Hv 0.5/15. By way of comparison, a traditional copper-tin-lead bearing having 10 wt. % tin, and 10 wt. % lead exhibits, on average, a considerably lower yield strength of 223 MPa, a comparable tensile strength of 301 MPa, a reduced elongation of about 8%, and a reduced hardness of about 96 HV 0.5/15. By way of further comparison, an identical engine wear test was conducted on bearings prepared according to the present invention against traditional copper-tin-lead bearings of the type described above. The traditional copper-tin-lead engine bearings exhibited a loss of about 12 microns due to wear, whereas bearings prepared according to the invention exhibited an average of about 10–11 microns, demonstrating that the wear and seizure resistance of bearings according to the invention are at least as good as if not better than that of the traditional copper-tin-lead engine bearings.

It has been surprisingly found that bearings prepared according to the present invention exhibit the beneficial property, when subjected to frictional sliding loading in use, of causing a certain amount of tin, which starts out being uniformly dissolved in a copper to serve as a copper-tin matrix, to migrate to the bearing surface, with the result being that a considerably high concentration of tin is developed at the bearing surface which was not present at the time the bearing was made and installed in a use application. This migration of tin and formation of a highly tin-rich layer at the bearing surface greatly increases the lubricity of the bearing and thus contributes to enhanced wear and seizure resistant characteristics of the bearing once the bearing is put into use. Such tin migration has not been observed in traditional copper-tin-lead bearings, nor with other proposed lead substitutes, such as nickel. While not entirely understood, it is believed that, when subjected to frictional sliding loading, the bismuth reacts with the tin in the matrix and effectively mobilizes the tin, drawing it to the bearing surface. Following testing, a visual inspection of the engine bearings prepared according to the invention showed the bearing surface to have a lustrous, tin-colored bearing surface, and a chemical analysis conducted on the bearing showed a considerably higher concentration of tin at the surface than in the rest of the copper-tin matrix below the surface, which remained uniform in its tin concentration.

This surprising property of tin migration has the benefit of eliminating or minimizing the need to apply a tin flash coating to the bearing surface prior to putting the bearing into service. The elimination of the flash coating step saves time and equipment and simplifies as well as lowers the cost of making engine bearings.

The elimination of lead from the engine bearings has the advantage of providing a more environmentally compliant engine bearing, and the substitution thereof with bismuth in the manner called for by the invention has the advantage of providing the same or better strength and wear/seizure resistant properties without requiring radical changes in the way engine bearings are made. As such, engine bearings prepared according to the invention are readily adaptable to new applications or existing applications that would otherwise call for copper-tin-lead bearings, and the manufacturer of bearings according to the invention can adapt to the making of such bearings without requiring new or different manufacturing equipment, and perhaps eliminating some of the steps and equipment normally associated with the manufacture of traditional copper-tin-lead bearings.

According to a further aspect of the invention, particular benefits have been realized when the copper-tin-lead bismuth powder metal material is produced from a blend of gas-atomized copper-tin-bismuth powder and water-atomized copper-tin-bismuth powder. Again, while not entirely understood, it is believed that the process by which the powders are made contributes to the mobilization of the tin or the bearing surface.

THE DRAWINGS

These and other objects, features and advantages of the invention will become more readily apparent when considered in connection with the following description and drawings, wherein.

DETAILED DESCRIPTION

Figure 1:
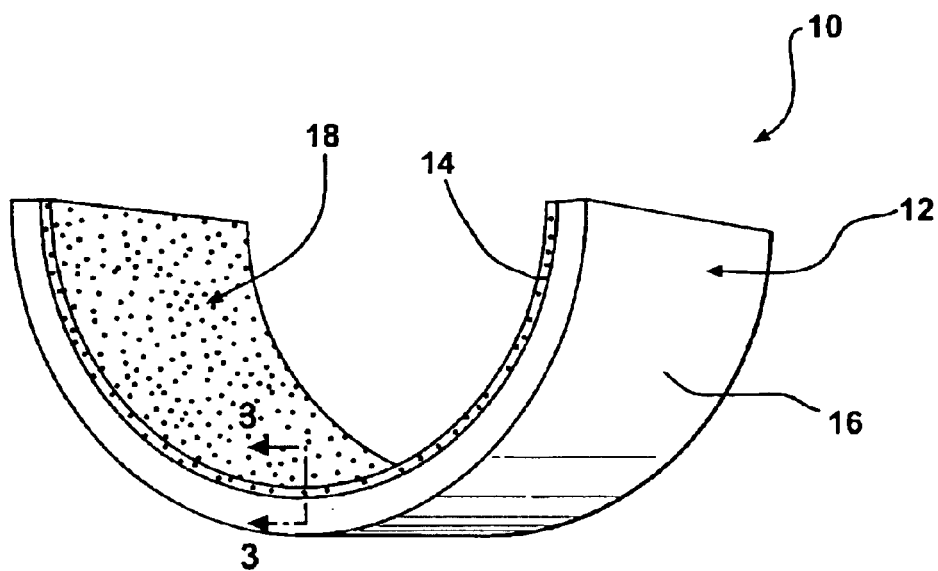
FIG. 1 is a schematic perspective view of an engine bearing constructed according to the present invention.
Figure 2:
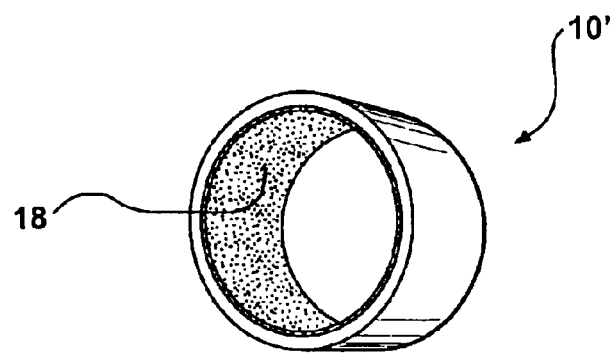
FIG. 2 is a perspective view of a pin bushing constructed according to the invention.

A bearing constructed according to the present invention is shown generally at 10 in FIG. 1 in the form of an engine bearing, and at 10' in FIG. 2 which represents a pin bushing such as that used in the small end opening of a connecting rod for journaling a wrist pin of a piston. For simplicity, the remainder of the description will be made in reference to the engine bearing 10, but it is to be understood that the description is equally applicable to the pin bushing 10'.

The engine bearing 10 is of the type comprising a half shell used in combination with a counterpart half shell bearing in an engine, or the like, to journal a rotating shaft, such as the crankshaft of an engine. The bearing 10 has a steel backing shell 12 having a concave inner surface 14 and a convex outer surface 16. Bearing material 18 is applied to the inner surface 14. The bearing material 18 is lead-free. By lead-free, it is meant that the bearing material contains either none or only incidental amounts of lead due to impurities (i.e., less than about 0.5%).

The bearing material 18 is fabricated of a bronze powder alloy, or blend of bronze alloys. The powder metal bearing material is sintered and bonded to the backing 12 to provide a lining of the bearing material against the inner surface 14 of the backing 12. As known to those skilled in the bronze bearing art, the technique used to bond the bearing material to the back 12 involves applying the bearing material 18 in loose powder form to the inner surface after which the bearing material is heated, sintered, rolled, and then sintered again to develop essentially a porous-free fully densified layer of the bearing material 18 which is permanently metallurgically bonded or united to the backing 12 to form a united multi-layer bearing structure. By fully dense, it is meant that the powder bearing material 18 is compressed and sintered to near fully theoretical density and is substantially impervious to oil or other substances as in the sense of porous, oil-retaining bearings to which the invention is not directed. Accordingly, it will be understood that fully dense or nearly fully dense means the bearing material 18 has a density exceeding 99% of full theoretical density, and preferably greater than 99.5%, and still more preferably 99.9% or more.

The bronze alloy bearing material 18 contains an amount of tin in the range of about 8 to 12% and more preferably 9 to 11%, an amount of bismuth equal to about 1 to 5%, and more preferably 3 to 4%; an amount of phosphorus equal to about 0.3 to 0.8 wt. % and more preferably 0.3 to 0.7 wt. %, with the balance consisting essentially of copper, allowing for incidental impurities and other additions which do not impair the physical properties of the bearing material or the mobilization of tin as will be described more fully below.

The bonded bearing layer 18 has a matrix 22 of copper and tin, with the tin being dissolved in solution in the copper. The phosphorus is likewise in solution in the matrix. The bismuth is not soluable in copper and exists as a fine dispersion of islands or phases of bismuth 20 dispersed substantially uniformally throughout the volume of the copper-tin matrix 22, as represented schematically in FIG. 3.

In a bearing application according to the invention, bismuth serves as a substitute for lead, and has shown to provide additional properties not shared by lead when used in the controlled amount called for by the invention (i.e., between 1 to less than 5 wt. %). The roll bonded and sintered fully dense bearing lining 18 of the invention has shown to exhibit the following physical properties:

Tensile strength≧400 MPa

Yield strength≧290 MPa

Elongation≧10%

Hardness 130≧HV 0.5/15

These physical properties meet or exceed traditional copper-tin-lead engine bearings as discussed in the previous section. In addition, engine bearings constructed according to the invention have as good or better wear and seizure resistant properties as compared to traditional copper-tin-lead engine bearings. In a comparative engine test, engine bearing constructed according to the invention exhibited a loss of material of about 10 to 11 microns, whereas traditional copper-tin-lead bearings tested under the same conditions exhibited a loss of 12 microns, indicating about a 10% decrease in wear of bearings constructed according to the present invention over traditional copper-tin-lead bearings.

In a study conducted on the materials, it was surprisingly found that when engine bearings are prepared according to the invention within the limits set forth above, the exceptional physical properties are achieved that enable bearings constructed according to the invention to be substituted for those applications now or in the future calling for traditional copper-tin-lead engine bearings. Although not entirely understood, one of the key factors attributing to the remarkable physical properties is the presence of the phosphorus which is effective at degassing the alloy during melting and atomization into powder, and the fully dense roll bonding and sintering of the bearing material onto the backing 12. Additionally, the physical properties mentioned above as well as fatigue strength is maintained by controlling the amount of bismuth added to the alloy. If added in amounts of 5% or more, bismuth has the effect of weakening the matrix structure since it does not dissolve in the matrix 22 and the bismuth islands 20 amount, effectively, to bismuth-filled holes in the otherwise strong matrix. If too much bismuth is present, the islands (and thus the holes they fill) become too large and the desired physical properties of the material are lost. As such, the addition of bismuth in the range called for by the invention has shown not to reduce the physical properties of the matrix below that which is desired for engine bearing applications and recited above.

Figure 3:
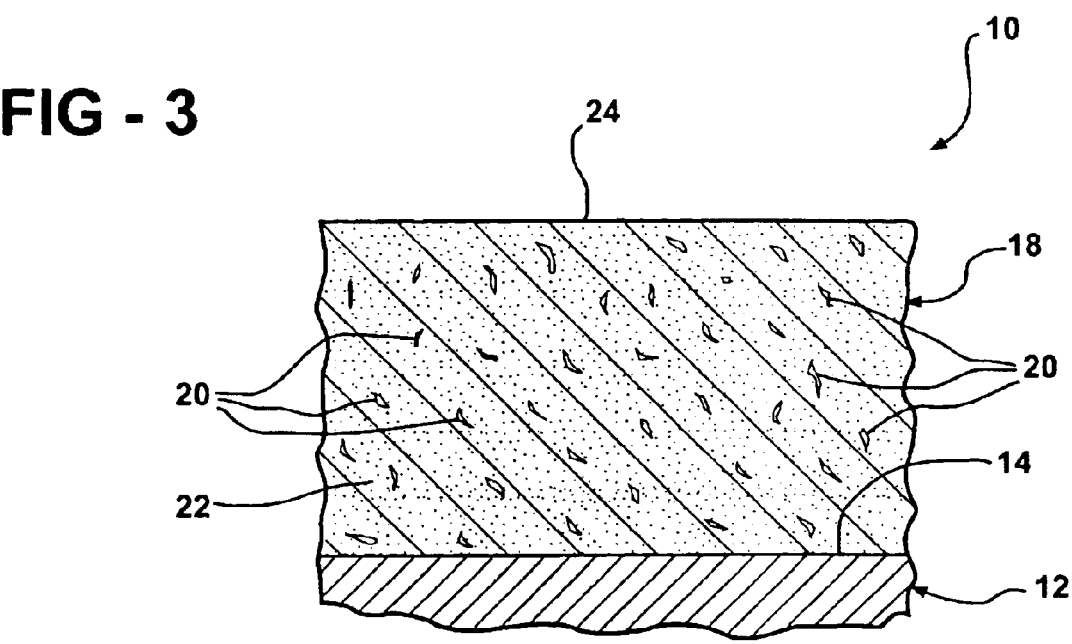
FIG. 3 is an enlarged fragmentary cross-sectional view of a bearing according to the invention in its manufactured, but pre-use, condition.
Figure 4:
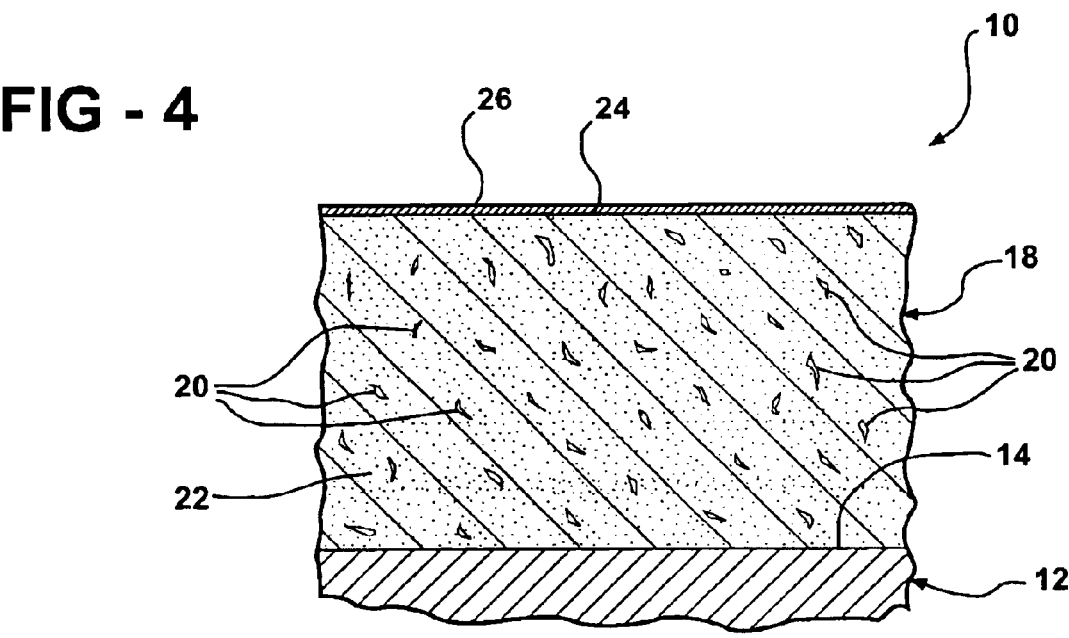
FIG. 4 is a view like FIG. 3 but showing the bearing following a period of use in service.

Bismuth has also surprisingly been shown to have a very desirable, positive effect on the wear and seizure resistance properties of the bearing layer 18. As shown in FIG. 3, when the bearing 10 is manufactured and installed in an engine, the tin is fully dissolved in the copper to yield a uniform copper-tin matrix 22. However, it has been surprisingly found that during operation when a frictional compressive sliding load is applied to the exposed bearing surface 24 of the bearing layer 18, a certain amount of tin in the matrix is caused to migrate through the matrix into the bearing surface 24, developing a tin-rich layer 26 at the bearing surface 24 as illustrated in FIG. 4. This tin-rich layer 26 serves as a lubricant at the bearing surface 24 and has the effect of reducing the wear and seizure resistance of the overall bearing 10. As the bearing 10 wears, the bearing material 18 has the characteristic of continuously replenishing the tin-rich layer, such that the layer 26 is always present and developing due to the mobilization of the tin in the matrix 22. The mobilization of the tin is believed to result from a reaction between the tin in solution and the bismuth under the load/friction conditions of bearing usage. The presence of the bismuth in combination with the fully dense powder metal structure of the matrix 22 provides the vehicle for transporting the tin from the matrix to the surface 24 in development of the tin-rich layer 26. Since the copper-tin-bismuth bearing material 18 has the characteristic of developing its own tin-rich layer 26 at the bearing surface 24, there is generally no need to apply a flash coating of tin or other tin overlay to the bearing material 18, as is often applied to bronze-lead engine bearings of the traditional type mentioned above.

By way of comparison, the tin mobility is not known to exist in copper-tin-lead bearings. Tests were also conducted on a copper-tin-nickel alloy and likewise no tin mobilization was found to be present. Only bismuth, in the amount specified by the invention, has shown to provide tin mobilization to improve wear and seizure characteristics while not unduly inhibiting the physical properties of the copper-tin matrix.

According to a further aspect of the invention, a copper-based powder metal mixture is prepared from a blend of copper-based gas atomized powder and copper-based water atomized powder. Test specimens of this gas/water atomized blend were prepared by compacting and sintering the material. Test specimens were similarly prepared from comparable compositions made up of only gas atomized powder and another set of test specimens made up of only water atomized powder, but of comparable composition to the gas/water blend of the first test specimens. The physical properties of the three sets of specimens were measured to compare their properties. It was surprisingly found that the gas/water atomized blend had significantly improved physical properties as compared to the test specimens of comparable compositions made from either 100% gas atomized or 100% water atomized powder. The improved physical properties include yield strength, tensile strength, ductility, hardness and seizure resistance; all of which play an important role in copper-based sintered powder metal bushing and bearing applications.

TABLE 1

Comparable Physical Properties of Cu—Sn—Bi P/M Specimens

| Composition* | Yield Strength Mpa | Tensile Strength Mpa | Elongation % | Hardness HV 0.5/15 | Seizure Load** N |
|---|---|---|---|---|---|
| 3.2 Bi (w.a.) | 292 | 375 | 4.7 | 127 | 4500 |
| 5 Bi (w.a.) | 300 | 389 | 3.3 | 138 | 4500 |
| 4 Bi (g.a.) | 299 | 370 | 2.4 | 123 | 4500*** |
| 4 Bi (blend) | 324 | 480 | 21.4 | 143 | 6500 |

*All compositions 90 parts Cu, 10 parts Sn with designated amounts of Bi in weight % relative to the CuSn
**Based on Torque Limit Wear Test with Seizure set at 20 Nm
g.a. means 100% gas atomized powder
w.a. means 100% water atomized powder
blend means a mixture of g.a. and w.a. powders
***entry based on expected comparable w.a. data

EXAMPLE 1

A 100% water atomized powder composition was prepared having 90 parts copper, 10 parts tin and an amount of bismuth equal to 3.2 wt. % of the copper-tin present in the mix. The water atomized powder was consolidated and sintered onto a steel backing strip according to bearing manufacturing practice and the physical properties of the sintered layer determined as set forth in Table 1.

EXAMPLE 2

The same process was repeated with 100% water atomized, 90/10 copper-tin with 5 wt. % bismuth. The physical properties were measured and are given in Table 1. It will be seen that there is no appreciable difference in the properties from about 3–5 wt. % bismuth with the 100% water atomized powder.

EXAMPLE 3

A 100% gas atomized powder was prepared containing 90 parts copper, 10 parts tin, and an amount of bismuth equal to about 4 wt. % relative to the amount of copper and tin in the powder composition. Test samples were compacted and sintered in accordance with the procedure mentioned above for Example 1. The physical properties were measured and are set forth in Table 1. It will be seen that there is no appreciable difference in the physical properties of the 100% gas atomized powder relative to the 100% water atomized powder containing about the same amount of bismuth.

EXAMPLE 4

A powder composition according to the invention was prepared using a blend of gas and water atomized powders which, when mixed together, yielded a composition having 90 parts copper, 10 parts tin and an amount of bismuth equal to about 4 wt. % relative to the amount of copper and tin in the mix.

The blend was prepared by pre-alloying a copper-bismuth alloy having about 8 wt. % bismuth relative to the amount of copper. The copper-bismuth alloy was water atomized to form a water atomized copper-bismuth powder. To this powder was added an amount of gas atomized copper-tin powder in an amount to reduce the overall weight percent of the bismuth in the blended powder mix to about 4 wt. % of the total copper and tin. This homogeneously blended mix was compacted and sintered according to the same procedure mentioned above for Example 1.

The physical properties were measured and are given in Table 1. Surprisingly, there is a marked increase in the physical properties of the blended water/gas atomized mixture as compared to the physical properties of comparable compositions made up of either 100% water atomized or 100% gas atomized powder. It will be seen, for example, that there is about a 45% increase in the seizure resistance of the blended composition as compared to either the water or gas atomized powders alone, and about a 500–800% increase in the ductility (% Elongation) of the blended composition as compared to either the gas or water atomized powders alone. There are also marked increases in each of the other physical properties attributed to the blend.

The amount of bismuth can vary between about 1% to about 15% in the blended mix.

The invention contemplates other water/gas atomized blended powder compositions which are copper-based and which would benefit from the same or other gain in physical properties over the water or gas atomized powders alone. Such systems include copper-tin-silver, copper-tin-lead, copper-tin, copper-zinc-bismuth, copper-zinc-lead, copper-zinc-silver, and copper-zinc. Also, some of the bismuth, lead or silver components could be substituted for one another, such that the copper-tin or copper-zinc systems could include amounts of bismuth and lead, bismuth and silver, or lead and silver, or all three in combination, preferably as the water-atomized component of the water/gas atomized blend.

In a preferred copper-tin-bismuth blended powder mix, the homogeneous blended mix is preferably lead-free and has the following composition ranges in weight percentage, a base of copper, 9–11% tin, 0.1% max lead, 1–10% bismuth, 0.3–0.7% phosphorus, 0.5% max each of zinc and nickel, 0.35% max of iron, 0.15% max of antimony, 0.015% max sulfur, and 0.005% max each of aluminum and silicon.

Obviously, many modifications and variation of the present invention are possible in light of the above teachings. It is, therefore, to be understood that within the scope of the appended claims, the invention may be practiced otherwise than as specifically described. The invention is defined by the claims.

What is claimed is:

1. A method of making a lead-free bearing comprising:

applying powder metal bearing material to a steel backing, the bearing material having a composition consisting essentially of 8 to 12% by weight of tin, 1 to less than 5% by weight of bismuth, 0.03 to 0.08% by weight of phosphorus, and the balance consisting essentially of copper; and rolling and sintering the powder metal bearing material onto the backing to bond the bearing material to the backing and to fully densify the bearing material.

2. The method of claim 1, including installing the bearing in use and applying friction and load forces to an exposed bearing surface of the bearing material, causing tin from a copper-tin matrix of the bearing material to migrate to the bearing surface to yield a tin-rich layer with the bearing surface.

* * * * *